Sept. 21, 1954 L. A. FALLIGANT 2,689,768
PORTABLE SELF-CONTAINED SPRAY UNIT
Filed July 5, 1949
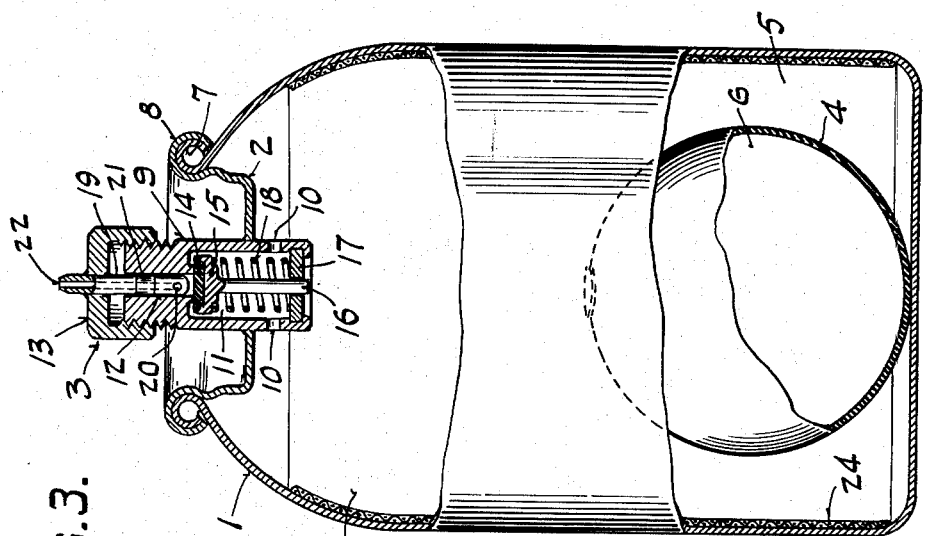
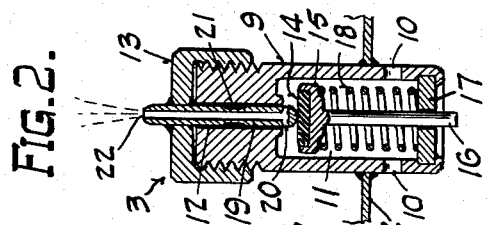
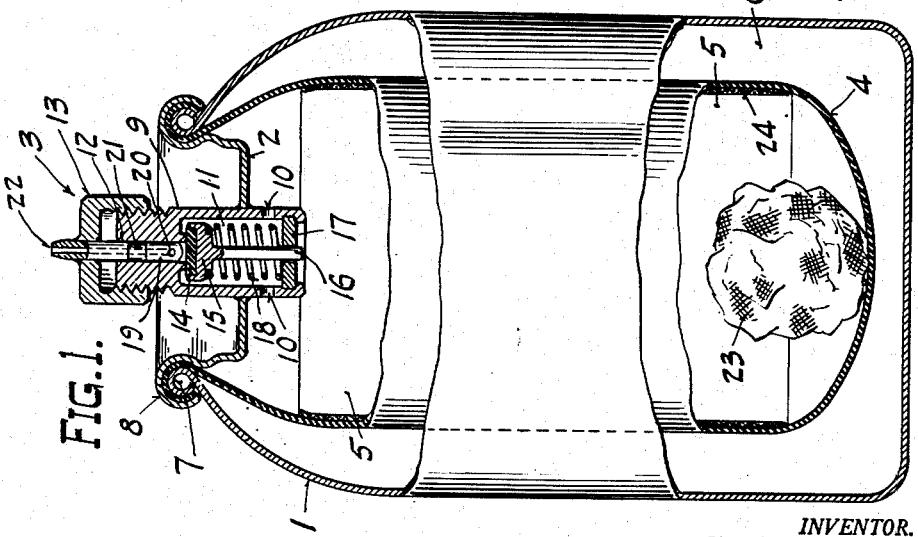
INVENTOR.
Louis A. Falligant
BY
ATTORNEYS.

Patented Sept. 21, 1954

2,689,768

UNITED STATES PATENT OFFICE 2,689,768

PORTABLE SELF-CONTAINED SPRAY UNIT

Louis A. Falligant, Madison, Wis.

Application July 5, 1949, Serial No. 102,990

6 Claims. (Cl. 299—95)

1

This invention relates to a portable self-contained unit which is adapted to the spraying or propelling of streams of almost any material such as paints, insecticides, deodorants, fire quenchers, fuels, and the like.

Heretofore, individual spray units known as insecticide and deodorant bombs have been highly inefficient due to the fact that the propellant was mixed with the body of the chemical being sprayed and was discharged therewith during the spraying operation. Bombs of this type required a mixture therein containing about 80% propellant, and leaving only 20% for the material being sprayed. Thus, a bomb which had a total capacity of one pound only contained one-fifth of that capacity of the material to be sprayed. The rest of the contents was propellant, which in many cases was more expensive than the active ingredient.

The principal object of the present invention is to provide a spray unit or bomb of very considerably greater efficiency so that less propellant is needed and a great capacity for active ingredients is provided.

Another object of the invention is to prevent the escape of the propellant with the material being sprayed, thereby conserving propellant.

Another object is to provide an uncontaminated spray of material from small portable self-contained spray units.

Another object is to provide a small portable self-contained spray bomb in which the spray pressure does not diminish substantially to reduce the effectiveness of the spray as the container approaches emptiness.

Another object is to increase the safety of handling and operating the spray unit.

Another object is to provide a unit which will dispense active ingredient of substantially uniform constituency.

Another object is to prevent waste of the active ingredient by loss of all propellant prior to complete discharge of the active ingredient.

Another object is to prevent waste of the active ingredient by entrapment within the container.

Another object is to provide higher propellant pressures without substantial reduction in the active spray ingredient.

Another object is to provide for the use of propellants which may be unsuitable for spraying directly with the active spray ingredient, and for the spraying of active ingredients which are unsuitable for mixing with known propellants.

According to the invention the propellant and the active spray ingredient are disposed in separate compartments of the bomb with a flexible partition therebetween capable of contracting from the propellant compartment or expanding into the spray ingredient compartment to expel the latter, and a bleeder action is obtained in the spray ingredient compartment to prevent entrapment of active ingredient therein by irregular contraction or expansion of the partition.

The accompanying drawing illustrates an embodiment of the invention adapted for small bombs for domestic and individual use.

In the drawing:

Figure 1 is an elevational view of a portable self-contained spray unit with parts broken away and sectioned;

Fig. 2 is an enlarged detail section showing the valve in discharge position; and Fig. 3 is a view similar to Fig. 1 of a modified construction.

The spray unit illustrated comprises an outer can-like casing or bomb shell 1 with a filler cap 2 secured therein and having the small spray nozzle 3 mounted on the cap. Various arrangements may be employed for the filler cap and spray nozzle and they may be secured separately to the shell or as a unit in the manner illustrated.

In carrying out the invention a diaphragm or flexible bag 4 is disposed within the shell 1 to partition the same into two chambers, chamber 5 being for active ingredient and chamber 6 being for propellant.

The diaphragm or bag 4 may be constructed of any generally impervious flexible material such as a metal foil, treated fabric, or a rubber or synthetic film. Where the diaphragm or bag 4 has to stretch in service it should be constructed of a suitably stretchable material such as rubber or a synthetic material.

The chamber 5 for active ingredients may be disposed on either side of the diaphragm, i. e. either inside or outside of bag 4. Fig. 1 shows a construction in which chamber 5 is inside bag 4 and chamber 6 is outside bag 4. Fig. 3 shows a construction in which chamber 5 is outside bag 4 and chamber 6 is inside bag 4.

Where chamber 5 is inside bag 4 it is convenient to secure the mouth of the bag in-between the rolled flanges 7 and 8 of shell 1 and cap 2, respectively, as shown in Fig. 1. In this construction the charge of propellant will be introduced into can 1 prior to the assembly of bag 4 and cap 2 therewith.

Where chamber 5 is outside bag 4 it is convenient to construct the bag as an independent sealed sphere surrounding the propellant charge and to introduce the same as a cartridge into can 1 prior to the assembly of cap 2 therewith. In this construction, which is illustrated in Fig. 3, the sphere or bag 4 should be of stretchable material as stated above.

The nozzle 3 for discharging active ingredient from chamber 5 is conveniently secured in cap 2 and may be of any suitable construction. The nozzle should have a manually controllable normally closed spring-pressed valve therein which automatically prevents the escape of active ingredient when not in use.

The nozzle 3 illustrated comprises a cylindrical valve body 9 extending through cap 2 centrally of the latter and welded thereto. The inner end of the valve body 9 is perforated as at 10, just inside the cap 2 and is hollow to provide a valve chamber 11. The outer end of the valve body is tubular with a relatively small axial opening 12 therethrough and is threaded externally to receive the threaded cap 13.

The valve in chamber 11 comprises a sealing gasket or washer 14 disposed over or around the inner end of opening 12 to seal the same against entrance of active ingredient. A plate 15 bears against the inner side of washer 14 to effect the seal. A stem 16 secured to plate 15 extends downwardly through a hole in a plate 17 at the opposite end of chamber 11 to guide the plate 15 and retain it in a position where it will always resume a position substantially parallel to the shoulder against which washer 14 seats around the inner end of opening 12.

A coil compression spring 18 is disposed between plates 15 and 17 to bias the same apart and to thereby effect a normal seating of the valve to close opening 12 and prevent leakage of active ingredient. Plate 17 may be held in chamber 11 by crimping inwardly of the inner end of the valve body after assembly of the valve and parts described in the chamber 11.

The valve is opened by means of a tubular plunger 19 secured axially to cap 13 and which extends through opening 12 to push washer 14 and plate 15 downwardly against spring 18 when the cap 13 is threaded downwardly upon the outer end of the valve body.

Tubular plunger 19 has one or more lateral holes 20 for admitting active ingredient into the same from valve chamber 11 upon unseating of the valve, as described.

A suitable packing 21, in the form of a ring, encircles plunger 19 to seal the plunger against the walls of opening 12 and thereby prevent any substantial escape of active ingredient into the cap 13 and the threads between it and the valve body.

The outer end of the tubular plunger 19 extends through cap 13 and constitutes the discharge orifice 22 for the spray nozzle.

In operation, threading of cap 13 downwardly upon the valve body causes plunger 19 to unseat the valve plate 15 and admits active ingredient through perforations at 10, valve chamber 11, openings 20, and through the hollow plunger 19 to orifice 22 where the active ingredient is discharged in a predetermined spray or stream, depending upon the ingredient and its use. Outward threading of cap 13 permits the valve to seat around opening 12 and stops the discharge of active ingredient.

The discharge of active ingredient is effected by reason of a pressure normally maintained thereon within can 1 by the propellant in chamber 6. For this purpose the propellant may be any one of a number of phase change materials which are retained in liquid phase by a low pressure at room temperatures. Examples of suitable materials are Freon, methyl bromide, and propane and butane gases. These materials have a vapor pressure at room temperature within the limits of safety for the container 1.

For the purpose of preventing the formation of a pocket in chamber 5 by reason of possible irregular flexing of the bag 4 a suitable amount of gauze 23 may be disposed in chamber 5 and which serves as a bleeder for the active ingredient which can then find a passage through the gauze to the outlet openings at 10 regardless of pocket formations in the bag. If desired, a course fabric lining 24 may be provided as a bleeder for bag 4, as illustrated in Fig. 1, for the same purpose. In Fig. 3 the lining 24 is shown along the outer wall of the can or shell 1 and within chamber 5.

The substantial improvement obtained by the present invention in the construction and use of insecticide bombs, small fire extinguishers, cosmetic sprays and paint sprays may be more readily appreciated by the following summary of the problems involved:

The amount of propellant required for a given amount of active ingredient is greatly reduced. In the present instance the amount of propellant is governed by the vapor pressure obtainable when the propellant has discharged substantially all of the active ingredient and fills the entire can 1. In general, the liquid propellant charged into chamber 6 will be less than 20% of the volume or capacity of can 1. This leaves 80% of the volume or capacity of can 1 for active ingredient. When this is compared with present-day insecticide bombs which require a ratio of about 80% propellant to 20% active ingredient, the advantage of the present invention is truly appreciated. The invention makes possible the spraying of low cost active ingredients such as paint with high cost propellants, an attainment not commercially economic under prior practice. The invention also makes possible a substantial saving in propellant, and the propellant is retained so that it can be reclaimed, if desired, by adopting a trade-in system for return of cans to the producer. The invention also provides a substantial saving in metal since a much greater amount of active ingredient can be sprayed from a given can and fewer or smaller cans are needed for a given market.

The vapor pressure of the propellant remains substantially constant. In prior practices where a non-volatile active ingredient was mixed with the propellant and a solution of the two was obtained, the resultant vapor pressure was lowered substantially, thereby requiring a higher relative proportion of propellant to maintain the desired pressure for spraying. The present invention entirely eliminates this difficulty.

There is no foaming of the spray. In prior practice where a solution or intimate mixture of propellant and active ingredient was obtained, the expansion of minute particles of the active ingredient in the spray by the propellant tended to produce a foam which was highly undesirable, particularly in the case of nasal sprays and hair tonics. The present invention entirely overcomes this difficulty.

In some instances it is possible to have the active ingredient contain some phase-change liquid propellant material such as Freon, and which may have a desired effect of producing additional atomization of the discharge. When this is done, the propellant in the propellant chamber may desirably have a higher vapor pressure than that in the active ingredient mix so that the latter will be retained in the mix without excessive vaporization prior to the discharge thereof.

It is not necessary to use a diluent to reduce the cost of propellant. Diluents, as employed in prior practice constituted a waste of space in the can and reduced the amount of active ingredient and of propellant. The present invention avoids the wasteful use of diluents and conserves the entire capacity of the can for active ingredient and propellant.

There is no loss in pressure whereby a portion of the active ingredient remains in the can without sufficient propellant to expel it. In prior practice, particularly with active ingredients that were in semi-solid suspensions or viscous form and did not form a solution with the propellant, there was danger of the propellant being discharged first leaving large amounts of "settled out" active ingredients in the container. This danger and waste are entirely eliminated in the present invention since none of the propellant is discharged through the nozzle and all of it remains in the container to provide the necessary discharge pressures. Solid suspensions that settle out of the active ingredient should be redispersed by thorough shaking prior to spraying.

There is no limitation upon the choice of active ingredients and propellants within the limits of spray possibilities for the active ingredient and of the proper vapor pressure for propellants. Since the propellant is never mixed with the active ingredient the toxicity of the propellant need not be considered. Chemical reactions between the propellant and active ingredient, which heretofore prevented the self-pressurized spraying of some active ingredients, need not be considered in the present instance.

Since the propellant of the present invention is a liquid-gaseous phase-change material, the volume of the container is very substantially reduced over that required by air pressure systems and the like wherein a charge of gas (air) is introduced into the container with the resultant danger of too high a pressure and possible explosion, or too low an amount of air to provide the required pressure for the full discharge of the active ingredient.

The purity of the spray remains in accordance with the consistency of the active ingredient, and there is no dilution by propellant which is highly undesirable in the first instance and which introduces a variation in consistency that becomes uncontrollable in prior practice.

Another advantage of the present invention lies in the safety of storage, transit and use obtained by positive separation of the propellant and active ingredient. Certain types of oil base active ingredients are classed as highly inflammable if their vapor pressure is raised as by the mixture therewith of a gasifying propellant. At the present time these can only be stored and shipped if employed with a sufficient amount of an inert propellant such as Freon to smother any combustion upon leakage. With the present invention the vapor pressure of the active ingredient is not raised and any leak which may develop in the container merely spills out the liquid-active ingredient, or in the case of the embodiment of Fig. 1, where chamber 6 surrounds chamber 5, any accidental puncturing of the can merely releases propellant, and the active ingredient remains safely within the can.

Various embodiments of the invention may be employed within the scope of the accompanying claims.

I claim:

1. A portable self-contained self-pressurizing unit for the discharge of fluid sprays and the like, comprising a sealed container, a flexible member within said container and dividing the space therein into two chambers, one of said chambers containing active ingredient to be discharged and the other of said members containing a self-pressurizing liquid propellant having a vapor pressure at room temperatures adapted to provide a predetermined discharge pressure for said active ingredient and to expand said propellant chamber into the space initially occupied by said active ingredient chamber as said active ingredient is discharged, said propellant chamber being entirely within said container and permanently sealed with the propellant therein, a valve controlled discharge nozzle for said active ingredient chamber, and a bleeder structure of permeable material within the active ingredient chamber to prevent possible sealing off of pockets which may be formed therein by said flexible member.

2. The unit of claim 1 in which the chambers comprise an inner chamber containing the active ingredient to be discharged, and an outer chamber containing the self-pressurizing liquid propellant, the outer walls of said container serving to transfer heat directly to said liquid propellant to compensate for heat loss in vaporizing the same during discharge of active ingredient from said inner chamber.

3. The unit of claim 1 in which the chambers comprise an inner chamber containing the self-pressurizing liquid propellant, and an outer chamber containing the active ingredient to be discharged.

4. The unit of claim 1 in which said propellant chamber comprises a free floating expansible cartridge within said container.

5. A portable self-contained self-pressurizing unit for the discharge of fluid sprays and the like, comprising a pressure container having a filling opening, a cap permanently sealed to the container to close said opening, a discharge nozzle carried by said cap and having a passage opening into the container for receiving material to be discharged, a collapsible bag secured to the inside of said cap and having said passage opening into the same, said bag being adapted to contain fluid to be discharged and to provide a separate chamber between it and the container walls for propellant material to pressurize the contents of the bag, a liquid propellant material within said separate chamber and having a vapor pressure tending to maintain a discharge pressure upon the bag at room temperatures, the outer walls of said container being adapted to transfer heat directly to said liquid propellant to compensate for heat loss in vaporizing the same during discharge of fluid from the bag, and a perforate bleeder disposed inside the bag and adapted to control the collapse of the bag to prevent the formation of pockets therein.

6. A portable self-contained self-pressurizing unit for the discharge of fluid sprays and the like, comprising a sealed container, a collapsible enclosure member within said container and dividing the space therein into an inner and an outer chamber, the inner of said chambers containing active ingredient to be discharged and the outer of said chambers containing a self-pressurizing liquid propellant having a vapor pressure at room temperatures adapted to provide a predetermined discharge pressure for said active ingredient and to collapse said enclosure member as said active ingredient is discharged, a valve controlled discharge nozzle carried by the wall of said container and having its inner end extending to said inner chamber to receive active ingredient therefrom, the outer walls of said container being adapted to transfer heat directly to said liquid propellant to compensate for heat loss in vaporizing the same during discharge of fluid from the inner chamber, and perforate bleeder means within said inner chamber to prevent the sealing off of pockets in said closure member as the latter is collapsed.

References Cited in the file of this patent

UNITED STATES PATENTS

| Number | Name | Date |
|---|---|---|
| 594,039 | Serve | Nov. 23, 1897 |
| 1,198,384 | Miller | Sept. 12, 1916 |
| 1,207,393 | Gammeter | Dec. 5, 1916 |
| 1,227,751 | Cobb | May 29, 1917 |
| 1,674,515 | Johnson | June 19, 1928 |
| 2,283,439 | Herman | May 19, 1942 |
| 2,459,743 | Trainer et al. | Jan. 18, 1949 |
| 2,513,455 | Cornelius | July 4, 1950 |

FOREIGN PATENTS

| Number | Country | Date |
|---|---|---|
| 577,513 | Germany | June 1, 1933 |
| 658,036 | France | Jan. 22, 1929 |